United States Patent
Babad

[15] 3,681,457
[45] Aug. 1, 1972

[54] METHOD OF MAKING TETRAMETHYLUREA

[72] Inventor: Harry Babad, North Muskegon, Mich.

[73] Assignee: The Ott Chemical Company

[22] Filed: Feb. 26, 1969

[21] Appl. No.: 802,665

[52] U.S. Cl. ............................................260/553 R
[51] Int. Cl. .............................................C07c 127/00
[58] Field of Search ...................................260/553 R

[56] References Cited

OTHER PUBLICATIONS

Luttringhaus et al., Angew Chem. Vol. 75, No. 22 (1963) pgs. 1063, 1067

Primary Examiner—Leon Zitver
Assistant Examiner—Michael W. Glynn
Attorney—Frank E. Robbins, James L. Bailey, Janet E. Price, Robert D. Weist, Martha A. Michaels and Dorothy R. Thumler

[57] ABSTRACT

Covers a method of making tetramethylurea by reacting dimethylamine and phosgene in presence of an aqueous base solution and then recovering the resultant tetramethylurea by utilizing a halogenated lower aliphatic solvent to extract the tetramethylurea from its reaction mass.

2 Claims, No Drawings

METHOD OF MAKING TETRAMETHYLUREA

Probably the simplest procedure of preparing tetramethylurea is carried out by reacting dimethylamine and phosgene in presence of a basic solution such as an aqueous solution of sodium hydroxide. However, after the reaction is complete there is extreme difficulty involved in separating out the wanted tetramethylurea product from the reaction mass. This material, being soluble in water, is difficulty salted out. It is necessary to use large excesses of concentrated caustic to free the tetramethylurea product from the reaction mass. Then after addition of the caustic one must then neutralize the residue adding still further to the overall cost of operation. The tetramethylurea which then becomes the top layer in a tow phase system involving the tetramethylurea and water is then separated from the aqueous phase. However, the separation is not clean and the top layer of tetramethylurea retains a substantial amount of water which is difficult to separate out from the desired tetramethylurea product.

In view of the above it therefore becomes an object of the invention to provide a novel method of recovering tetramethylurea from its reaction mass.

A specific object of the invention is to react dimethylamine and phosgene in presence of a basic aqueous solution to form tetramethylurea, and thereafter conveniently and simply extract the tetramethylurea product from the reaction mass without carrying along substantial amounts of unwanted water.

A still further object of the invention is to carry out the just described extraction whereby at least 90 percent of the available tetramethylurea is extracted out from the reaction mass.

Other objects will appear hereinafter.

In accordance with the invention a new method of recovering tetramethylurea from its reaction mass has been discovered. Tetramethylurea, as noted above, is best made by reacting dimethylamine and phosgene in presence of an aqueous base solution. The tetramethylurea is then recovered from the reaction mass. The gist of the present invention involves the step of utilizing a halogenated lower aliphatic solvent as an extractant whereby tetramethylurea is separated out from its reaction mass. The tetramethylurea is thereafter separated from both water and the halogenated lower aliphatic solvent, preferably by distilling the aliphatic solvent and water away from the tetramethylurea. The tetramethylurea product is then itself distilled in order to form a highly purified product.

The initial part of the reaction is carried out in a conventional manner, that is, two moles of dimethylamine are reacted with one mole of phosgene in presence of the strong base, such as an aqueous solution of sodium hydroxide. Excess sodium hydroxide is employed over and above that amount needed to neutralize the hydrochloric acid released in the reaction.

Thereafter, to the reaction mass consisting of tetramethylurea, sodium chloride, excess base such as sodium hydroxide, or calcium hydroxide and water is added a halogenated aliphatic lower solvent. This solvent generally contains five carbons or less and more than two halo groups. Exemplary solvents of this type are ethylene dichloride, trichloroethylene, tetrachloroethylene, chloroform, 1,3,3-trichloropropane, 1,1,3,3-tetrachloropropane, 1,1,4,4-chlorobutane, ethylenedibromide, tribromoethylene, etc. Of these, the most preferred is ethylenedichloride. This latter material has been found to have a partition coefficient in the tetramethylurea isolation of from about 100 to about 1,000.

Generally, sufficient lower aliphatic solvent is added to extract or free the tetramethylurea from the water. Usually at least 0.01 parts of aliphatic solvent are added per part of tetramethylurea present. More often at least 0.1 part of aliphatic solvent per part of tetramethylurea is employed, and most preferably 0.1 – 0.5 part of aliphatic solvent is added per part of tetramethylurea present in the reaction mass.

The two phases are then formed, one phase primarily made up of water, and the other phase consisting of tetramethylurea, aliphatic solvent and water. The aliphatic solvent and water are then distilled out of the tetramethylurea which is usually recovered in at least a 90 percent yield based on amount of tetramethylurea present and more often is recovered in higher yields. Depending upon the amount of aliphatic solvent used the aliphatic solvent may come off as an azeotrope with water, or the water and aliphatic solvent may be separately distilled in succeeding fractions. Thereafter, the tetramethylurea either under vacuum or at atmospheric pressure is distilled out of the reaction mass.

It is interesting to note at this time that only one particular class of materials is successful in freeing the tetramethylurea from water, that is, the halogenated lower aliphatic class, and particularly chlorinated lower aliphatics, such as ethylenedichloride. Other organic solvents were also employed here in exactly the same process sequence, and were completely ineffective relative to the halogenated lower aliphatic solvents employed. For example, toluene, benzene, butyl acetate, butanol, hexane, ethyl ether, and methyl ethyl ketone were also tried here with little or no success in freeing the tetramethylurea from bound water. Such a discovery was quite surprising in view of the similarity of many of the solvents to those employed in the process of the invention. In many cases, solvents of the just mentioned classes are interchangeable with halogenated lower aliphatic solvents for one role or the other. Such is not the case here.

The following examples illustrate the process of the invention. It is understood, of course, that these examples are merely illustrative, and that the invention is not to be limited thereto. All parts and percentages are by weight unless otherwise indicated.

EXAMPLE I

A vessel containing 200 g. (2.5 moles) of 50 percent caustic was charged with 90 g. (2moles) of dimethylamine at 0°– 5° C. To this was added with stirring 109 g. (1.1 moles) of phosgene at the rate of 2.0 g./min. while maintaining the temperature between 20°– 60° C. The reaction mixture was stirred for an additional 15 minutes and then extracted twice with 25 ml. portions of ethylene dichloride. The combined extracts were fractionated and the product was recovered in 95 percent yield (b.p. 41-6°/10 mm).

EXAMPLE II

Example I was followed except 84 g. (1.5 moles) of calcium oxide was utilized. The reaction mass was then extracted two times using 100 ml. ethylene dichloride each time. A high recovery of tetramethylurea was realized.

EXAMPLE III

Here the procedure of Example I was followed with the exception that methylene dichloride was used as an extractant.

EXAMPLE IV

In this run, the procedure of Example I was carried out except carbon tetrachloride was used to extract the tetramethylurea.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

1. In a method for making tetramethylurea which comprises the steps of reacting dimethylamine and phosgene in the presence of an aqueous sodium hydroxide or calcium hydroxide solution and recovering tetramethylurea from the resulting reaction mass, the improvement comprising the steps of extracting said tetramethylurea from said reaction mass with a chlorinated aliphatic hydrocarbon selected from the class consisting of ethylene dichloride and methylene dichloride to obtain an extract containing said tetramethylurea, said chlorinated aliphatic hydrocarbon, and a small amount of water, and thereafter separating said tetramethylurea from both water and said chlorinated aliphatic hydrocarbon.

2. In a method for making tetramethylurea which comprises the steps of reacting dimethylamine and phosgene in the presence of an aqueous sodium hydroxide or calcium hydroxide solution and recovering tetramethylurea from the resulting reaction mass, the improvement comprising the steps of extracting said tetramethylurea from said reaction mass with ethylene dichloride to obtain an extract containing said tetramethylurea, said ethylene dichloride, and a small amount of water, and thereafter separating said tetramethylurea from both water and said tetraethylene chloride.

* * * * *